United States Patent
Huang et al.

(10) Patent No.: US 6,201,799 B1
(45) Date of Patent: Mar. 13, 2001

(54) PARTIAL DECORRELATION FOR A COHERENT MULTICODE CODE DIVISION MULTIPLE ACCESS RECEIVER

(75) Inventors: Howard C. Huang, Red Bank Township, Monmouth County; Chih-Lin I, Monmouth, both of NJ (US)

(73) Assignee: Lucent Technologies, Inc, Murray Hill, NJ (US)

( * ) Notice: Subject to any disclaimer, the term of this patent is extended or adjusted under 35 U.S.C. 154(b) by 0 days.

(21) Appl. No.: 08/846,454

(22) Filed: May 1, 1997

(51) Int. Cl.[7] .................................................. H04B 15/00

(52) U.S. Cl. ............................................ 370/342; 375/346

(58) Field of Search ..................................... 370/342, 335, 370/328, 441, 320; 375/346, 343, 340, 341, 342, 347, 348, 349, 200, 208, 209, 210

(56) References Cited

U.S. PATENT DOCUMENTS

| | | | |
|---|---|---|---|
| 5,506,861 | * 4/1996 | Bottomley | 375/200 |
| 5,677,930 | * 10/1997 | Bottomley | 375/208 |
| 5,724,378 | * 3/1998 | Mike et al. | 375/200 |
| 5,734,648 | * 3/1998 | Adachi et al. | 370/342 |
| 5,764,858 | * 6/1998 | Sheu et al. | 395/22 |
| 5,793,796 | * 8/1998 | Hulbert et al. | 375/206 |

* cited by examiner

*Primary Examiner*—Ajit Patel
*Assistant Examiner*—Brian Nguyen (57) ABSTRACT

A Multicode (MC) Code Division Multiple Access (CDMA) receiver receives J encoded multicode channels (where J>1) over L multiple air signal paths (where L>1) and forms a decorrelator output vector in which for each of the J multicode channels, the interference caused by the other J-1 multicode channels has been cancelled. When the MC CDMA receiver is a coherent receiver, a pilot interference canceller cancels a received pilot signal from the J channel code of each of the received J multicode channels prior to forming the decorrelator output vector.

17 Claims, 4 Drawing Sheets

PARTIAL DECORRELATION FOR A COHERENT MULTICODE CODE DIVISION MULTIPLE ACCESS RECEIVER

FIELD OF THE INVENTION

This invention relates to Coherent Multicode (MC) Code Division Multiple Access (CDMA) receivers and, more particularly, to a Coherent MC-CDMA receiver which uses a partial decorrelator.

BACKGROUND OF THE INVENTION

Code-Division Multiple Access (CDMA) has become one of the most prominent schemes for wireless communication systems. In a given radio frequency channel, individual CDMA data channels are distinguished from one another by different code sequences. A multiple code (MC) CDMA receiver allows for communication at J>1 times the base data rate by simultaneously demodulating J data channels. Due to the wide band nature of the CDMA signal, the receivers can be made robust against fading by exploiting the multipath diversity using a RAKE receiver. In a coherent CDMA system, a pilot signal is often transmitted so that the RAKE receiver can obtain amplitude and phase estimates of the channel needed for coherent detection. This pilot signal is usually designed to be orthogonal to the data channel spreading codes so that in the rare case of no multipath dispersion, the pilot signal will not cause interference at the matched filter output of the desired data channel. If there is multipath dispersion, there will be unwanted interference at the RAKE receiver's matched filter output due to a variety of multipath components. Specifically, for a given multipath component of a desired data channel at the receiver, its RAKE receiver output will have unwanted contributions due to other multipath components of itself, the other channels, and the pilot signal. As a result, the performances of the conventional RAKE and MC-CDMA receiver suffer as a consequence of ignoring the interchannel multipath interference .

In our recently allowed patent application entitled PILOT INTERFERENCE CANCELLATION FOR A COHERENT WIRELESS CODE DIVISION MULTIPLE ACCESS RECEIVER, Ser. No. 08/700,266, filed on Aug. 20, 1997, we introduced a pilot interference canceller which improved the performance of a coherent CDMA receiver by reconstructing and canceling out pilot multipath interference prior to demodulation by the RAKE receiver. Notwithstanding the interference reduction provided by the pilot interference canceller, there is a continuing need to eliminate the interchannel multipath components of interference in MC-CDMA receivers.

SUMMARY OF THE INVENTION

In accordance with the present invention, a partial decorrelation (PD) interference cancellation method and apparatus is described which eliminates interference for a multiple code (MC) CDMA receiver that simultaneously demodulates J>1 data channels. Our decorrelator is partial in that the detector decorrelates with respect to only the known J users as opposed to all K users. Our invention expands on prior multiuser decorrelation techniques for synchronous CDMA channels (as described by R. Lupas and S. Verdú, "Linear Multiuser Detectors for Synchronous Code-Division Multiple-Access Channels," IEEE Transactions on Information Theory, Vol. 35, No. 1, pp. 123–136, January 1989) and its application for fading multipath CDMA channels (see the article by H. C. Huang and S. C. Schwartz, "A Comparative Analysis of Linear Multiuser Detectors for Fading Multipath Channels," Proceedings of the 1994 IEEE Globecom Conference, pp. 11–15, November 1994). Our invention is also an enhancement of the technique described in the article by C. -L. I, S. ten Brink, S. Nanda, C. A. Webb III, H. C. Huang, and R. D. Gitlin, "IS-95 Enhancements for Multimedia Services," Bell Labs Technical Journal, Winter 1997, which is incorporated by reference herein .

More specifically, in demodulating a particular MC data channel, our PD eliminates interference due to the other J-1 MC data channels. According to our invention, a MC CDMA receiver receives L time-delayed, complex-amplitude-modulated replicas of the transmitted CDMA signal which is the sum of $K \geq J$ data channels signals and a pilot signal. A decision statistic for the desired J MC data channels is obtained using a bank of J RAKE receivers. Thereafter, a partial decorrelator (PD) processes the decision statistic to suppress, for each of one of the J RAKE receiver outputs, interference caused by the other J-1 data. The resulting decorrelator output vector is a vector in which for each of the J components, the interference caused by the other J-1 multicode channels has been suppressed. This vector is used to determine the data transmitted on the J MC data channels.

According to a feature of the invention, when a pilot signal is transmitted to aid in obtaining coherent channel estimates, a pilot interference canceller (PIC) cancels a received pilot signal from the J RAKE receivers. In this manner the PD can be used in conjunction with the PIC so that the combined PIC/PD detector encounters interference due only to the non-MC data channels and enjoys the compound benefits of both techniques.

DETAILED DESCRIPTION

Figure 1:
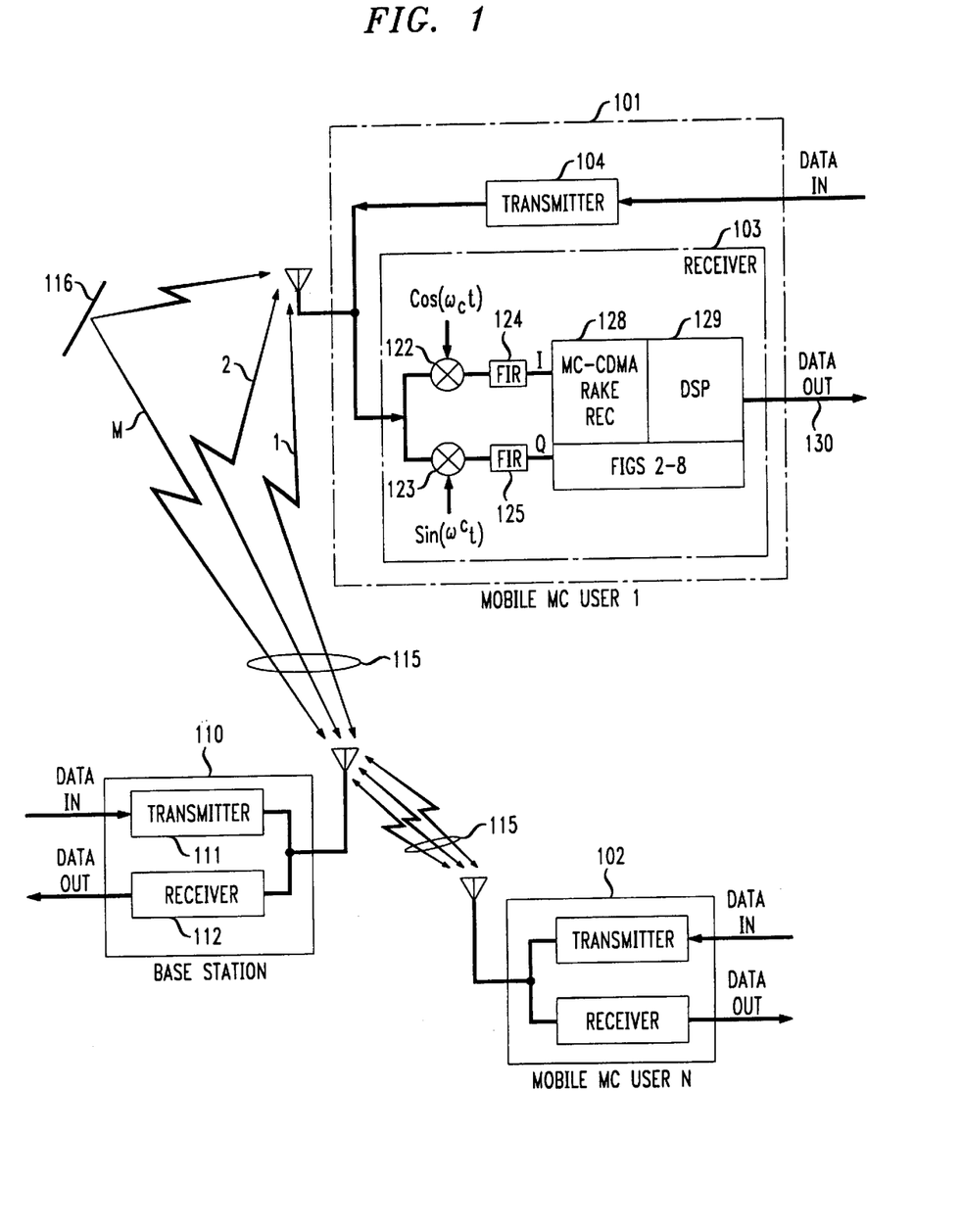
FIG. 1 shows a simplified block diagram of an illustrative MC-CDMA system and a block diagram of a receiver that can be used at the base station or at any of the mobile user stations of a MC-CDMA system.

FIG. 1 shows a simplified block diagram of an illustrative CDMA system in which the present invention may be utilized. Also shown are block diagrams of receivers that can be used at the base station and at any of the user stations of a CDMA system. One example of such a system is described in U.S. Pat. No. 5,737,326 issued on Apr. 7, 1998 and entitled "AN IMPROVED MULTI-CODE CODE DIVISION MULTIPLE ACCESS RECEIVER" which is incorporated by reference herein. The system of FIG. 1 includes a plurality of mobile user stations (1–N), shown as 101–102, which enables a plurality of users (1–N) to communicate with a base station unit 110 at one cell site. Mobile user station 101 users a MC receiver and demodulates J>1 data channels. Mobile user station 102 uses a conventional RAKE receiver and demodulates one data channel.

The base station 110 includes a transmitter 111 for providing multi-channel (illustratively K in our example, where K is a integer greater than J) coherent forward link communications to each of the user stations 101-102. Transmitter 111 sends a Walsh pilot signal $W_0$ along with the K data channels to the mobile stations 101–102. Each of the K data channels are encoded using a different Walsh code which is orthogonal to the Walsh code of other data channels and to the Walsh code of the pilot signal. The base station 110 also includes a receiver 112 for receiving the J multi-channel (MC) data in the reverse link from each of the mobile stations 101–102.

Each of the user stations 101–102 include a forward link receiver 103 and a reverse link transmitter 104. The air space between the base station 110 and the user stations 101–102 usually provide a multipath environment 115 for both the forward and reverse link communications. Illustratively, L multiple paths are shown. Some of the multipaths are the result of reflection off objects, such as 116.

The illustrative MC-CDMA receiver with partial decorrelator 103 receives the multipath coherent radio frequency signals (of the K data channels) via antenna 121. Its goal is to extract the data on the J desired MC channels. The multipath signals are down-converted by modulators 122 and 123, using radio frequency signals $\cos(\omega_c t)$ and $\sin(\omega_c t)$, respectively. The output of demodulators 122 and 123 are each filtered by an anti-aliasing LPF (Low Pass Filter) 124 and 125, respectively, to produce a resulting baseband I and Q signals. The I and Q signals, are then further processed by a MC-CDMA RAKE receiver 128 and a Digital Signal Processor (DSP) 129 to produce the output data signal 130. In addition to the weighting and combining processes of the J RAKE receivers, the DSP also performs the partial decorrelation processing of the present invention.

Before we discuss the particular embodiment of our MC-CDMA receiver with partial decorrelator, we first review the operations of a prior art MC-CDMA receiver. First, we introduce some notation in the following section. We then discuss the Conventional MC-CDMA receiver implemented using fat fingers. We then discuss an enhanced MC-CDMA receiver which uses pilot interference cancellation. Finally, we provide motivation and discuss the operation of the MC-CDMA receiver with pilot interference cancellation and partial decorrelation.

Notation

We first consider an IS-95 downlink signal containing the pilot signal and K≧J data channels. We assume the J MC channels are indexed by k=1, . . . , J. Suppose L multipath components of this signal are detected at the mobile receiver. Subchip rate samples of the complex baseband received signal are obtained by sampling at a rate of ρ samples per chip interval. We assume that the channel amplitude remains constant over a symbol interval but that it can vary from symbol to symbol. Likewise, IS-95 dictates that the pilot spreading code (also known as the short code) and the data channel spreading codes (which are component-wise products of Walsh sequences and the short code sequence) vary from symbol to symbol. During bit interval n, the receiver processes $\rho N_c + \delta_{L-1}$ complex-valued samples, where $N_c$ is the number of chips per symbol and $\delta_l$ is the delay of multipath signal l(l=0 . . . L−1) in terms of integer subchip intervals. Without loss of generality, we order the delays such that $\delta_{L-1} > \delta_{L-2} > \ldots > \delta_0 = 0$. We assume that these delays have been acquired by a pilot searcher. The received samples are collected to form a complex $(\rho N_c + \delta_{L-1})$-vector $\tilde{r}^{(n)}$:

$$\tilde{r}^{(n)} = \sum_{l=0}^{L-1} c_{(l)}^{(n)}\left[A_0 \tilde{p}_{(l)}^{(n)} + \sum_{k=1}^{K} A_k \tilde{s}_{k(l)}^{(n)} b_k^{(n)}\right] + \sum_{l=1}^{L-1} c_{(l)}^{(n-1)}\left[A_0 \tilde{p}_{(l)}^{(n-1)}[L] + \sum_{k=1}^{K} A_k \tilde{s}_{k(l)}^{(n-1)}[L] b_k^{(n-1)}\right] + \sum_{l=0}^{L-2} c_{(l)}^{(n+1)}\left[A_0 \tilde{p}_{(l)}^{(n+1)}[R] + \sum_{k=1}^{K} A_k \tilde{s}_{k(l)}^{(n+1)}[R] b_k^{(n+1)}\right] + \tilde{n},$$ (1)

where $c_{(l)}^{(n)}$ is the complex channel amplitude of multipath signal l during symbol n;

$A_0$ and $A_k$, respectively, are the real amplitudes of the pilot signal and data signal k;

$b_k^{(n)}$ is the data bit of channel k during symbol n;

$\tilde{n}$ is complex zero-mean additive white Gaussian noise vector whose real and imaginary components are i.i.d. with covariance $\sigma^2 I_{\rho N_c \delta_{L-1}}$, where $I_q$ is a q×q identity matrix and $\sigma^2$ is the noise variance;

$\tilde{p}_{(l)}^{(n)}$ and $\tilde{s}_{k(l)}^{(n)}$ are, respectively, the subchip-rate complex pilot and data channel spreading corresponding to multipath signal l during symbol n. The data channel spreading code is defined by IS-95 as the component-wise product of the pilot spreading code and the orthogonal Walsh code assigned to this channel. The vectors $\tilde{p}_{(l)}^{(n)}$ and $\tilde{s}_{k(l)}^{(n)}$ are length $(\rho N_c + \delta_{L-1})$ and are padded with zeros so that their nonzero signal components are appropriately aligned to the corresponding multipath delay. In other words, the first $\delta_l$ of $\tilde{p}_{(l)}^{(n)}$ and $\tilde{s}_{k(l)}^{(n)}$ are zero, followed by the ρNs nonzero subchiprate signal components corresponding to multipath l followed by $\delta_{L-1} - \delta_l$ zeros.

The remaining terms in (1) correspond to the intersymbol interference caused by signals on symbol intervals (n−1) and (n+1). Specifically, the first $\delta_l$ elements of $\tilde{p}_{(l)}^{(n-1)}[L]$ and $\tilde{s}_{k(l)}^{(n-1)}[L]$ (l=1 . . . L−1; the "L" in brackets denotes the "left"-side interference) are the last $\delta_l$ nonzero elements of $\tilde{p}_{(l)}^{(n-1)}$ and $\tilde{s}_{k(l)}^{(n-1)}$, respectively, and the remaining elements are all zero. Similarly, the last $\delta_{L-1} - \delta_l$ elements of $\tilde{p}_{(l)}^{(n-1)}[R]$ and $\tilde{s}_{k(l)}^{(n-1)}[R]$ (l=0 . . . L−2; "R" in brackets denotes the "right"-side interference) are the first $\delta_{L-1} - \delta_l$ nonzero elements of $\tilde{p}_{(l)}^{(n+1)}$ and $\tilde{s}_{k(l)}^{(n+1)}$, respectively, and the remaining elements are all zero.

The samples of $\tilde{r}^{(n)}$ corresponding to the $l^{th}$ multipath component are extracted using an on-time selector for processing by finger l of the RAKE receiver. Number the elements of $\tilde{e}^{(n)}$ as 0, 1, . . . , $\gamma N_c + \delta_{L-1} - 1$, and let $r_{(l)}^{(n)}$, the on-time selector output of path l, be an $N_c$-vector containing elements $\delta_l$, $\delta_l + \gamma$, . . . , $\delta_l + (N_c - 1)\gamma$ of $\tilde{r}^{(n)}$. Thus, $$r_{(l)}^{(n)} = \sum_{j=0}^{L-1} c_{(j)}^{(n)}\left[A_0 p_{(j[l])}^{(n)} + \sum_{k=1}^{K} A_k s_{k(j[l])}^{(n)} b_k^{(n)}\right] +$$ (2)

$$\sum_{j=1}^{L-1} c_{(j)}^{(n-1)} \left[ A_0 p_{(j|l)}^{(n-1)}[L] + \sum_{k=1}^{K} A_k s_{k(j|l)}^{(n-1)}[L] b_k^{(n-1)} \right] +$$

$$\sum_{j=0}^{L-2} c_{(j)}^{(n+1)} \left[ A_0 p_{(j|l)}^{(n+1)}[R] + \sum_{k=1}^{K} A_k s_{k(j|l)}^{(n+1)}[R] b_k^{(n+1)} \right] + n$$

where $p_{(j|l)}^{(n)}$ is defined as the $N_c$-vector whose elements are those of $\tilde{p}_{(j)}^{(n)}$ corresponding to the output of the on-time selector for multipath l. Hence, $p_{(j|l)}^{(n)}$ contains elements $\delta_l$, $\delta_l+\gamma$, ..., $\delta_l+(N_c-1)\gamma$ of $\tilde{p}_{(j)}^{(n)}$. Since the "on-time" samples for path l, $p_{(l|l)}^{(n)}$, are equivalent for all multipaths l=0 ... L−1, we will use $p^{(n)}$ as shorthand. We also define the analogous $N_c$-vectors $p_{(j|l)}^{(n+1)}[L/R]$ as the $N_c$-vector whose elements are those of $\tilde{p}_{(j)}^{(n\pm1)}[L/R]$ corresponding to the output of the on-time selector for multipath j. Similarly, $s_{k(j|l)}^{(n)}$, $s_{k(j)}^{(n)}$, and $s_{k(j|l)}^{(n\pm1)}[L/R]$ denote the analogous chip-rate $N_c$-vectors for the data channel spreading codes. We will use $s_k^{(n)}$ to represent $s_{k(0|0)}^{(n)}= \ldots s_{k(L-1|L-1)}^{(n)}$. The on-time spreading code sample vector $(s_k^{(n)})$ is the component-wise product of the corresponding pilot vector $(p^{(n)})$ and the $N_c$-length Walsh code vector of channel k $(w_k)$: $s_k^{(n)}=p^{(n)} \circ w_k$. The on-time chip-rate spreading code vectors are normalized such that $(s_k^{(n)}, s_k^{(n)})=(p^{(n)}, p^{(n)})=1$, where $(x,y)$ denotes the inner product between complex vectors x and y.

Conventional MC-CDMA Receiver

An illustrative example of this receiver which utilizes "fat fingers" is described in the previously-identified U.S. Pat. No. 5,737,326.

Figure 2:
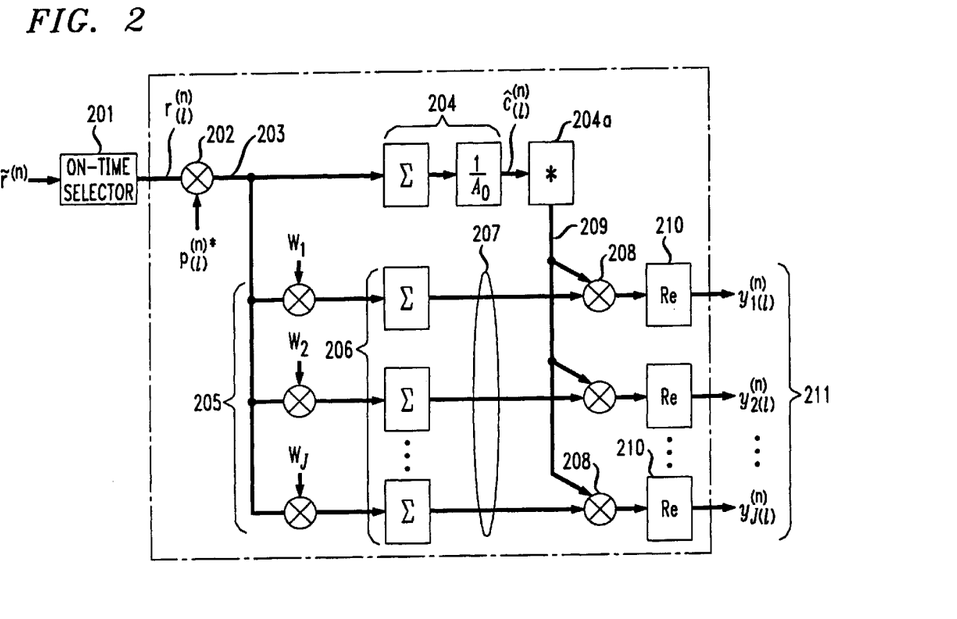
FIG. 2 shows an illustrative prior art "fat finger" detector for each of the J MC channels.

The fat finger receiver shown in FIG. 2, simultaneously demodulates the pilot signal and J data channel signals corresponding to multipath component l (l=0 ... L−1). The fat finger receiver consists of a single pilot correlator 204 for obtaining an estimate of the channel coefficient $\hat{c}_{(l)}^{(n)}$ and J processors 205–206 for correlating the received signal with each of the data channel Walsh codes. A complex graphical notation is used in FIG. 2 for simpler schematic drawings and analysis of a fat finger.

For processing the nth symbol, the on-time selector (OTS) 201 of fat finger l picks out every ρ samples from $\tilde{r}^{(n)}$ corresponding to the delay of path l to form the chip-rate vector $r_{(l)}^{(n)}$. The input signal vector $\tilde{r}^{(n)}$ includes signal vectors representing the digitized form of the I and Q inputs of FIG. 1. This vector $\tilde{r}^{(n)}$ is correlated 202 with the complex conjugate of the pilot sequence $p^{(n)}$ (the conjugate is denoted as $p^{(n)*}$) to remove the pilot spreading for path l, thereby forming the pilot-multiplied signal 203. Using the pilot-multiplied signal 203, a channel estimate $\hat{c}_{(l)}^{(n)}$ for path l is obtained by accumulating 204 the correlator output over a symbol period (using accumulator 204) and normalizing by the pilot amplitude $A_0$. The conjugate unit 204a forms the complex conjugate of $\hat{c}_{(lk)}^{(n)}$. This estimate can then be further refined using a channel-estimation algorithm (not shown) which considers previous accumulator outputs. For example, in a slow fading channel, $\hat{c}_{(l)}^{(n)}$ may be the weighted average of the current and previous accumulator outputs; however, in our analysis, we will assume that the estimate uses only the current symbol's accumulator output. Therefore, the channel estimate is the accumulator 204 output normalized by the pilot amplitude:

$$\hat{c}_{(l)}^{(n)} \equiv \frac{1}{A_0} \langle p^{(n)}, r_{(l)}^{(n)} \rangle$$

Note that in the actual implementation, normalization is not necessary; we use it in the analysis, however, so that if the channel estimates are perfect, we have $\hat{c}_{(l)}^{(n)}=c_{(l)}^{(n)}$. Each of the J data correlators 205 multiplies the pilot-multiplied signal 203 with the appropriate Walsh codes $(w_1, \ldots, w_J)$ used for the J MC data channels. The results are accumulated 206 over a symbol period to form the result 207. This correlation/accumulation is equivalent to summing the components of the component-wise product $r_{(l)}^{(n)} \circ p^{(n)*} \circ w_k$. This result 207 is weighted, in multipliers 208, by the complex conjugate of the channel estimate: $\hat{c}_{(l)}^{(n)*}$, 209, and the real parts, 210, of the J weighted outputs 211 of fat finger l are obtained:

$$y_{k(l)}^{(n)}=Re[\hat{c}_{(l)}^{(n)*}\langle s_k^{(n)}, r_{(l)}^{(n)} \rangle] k=1, \ldots, J \quad (3)$$

Figure 3:
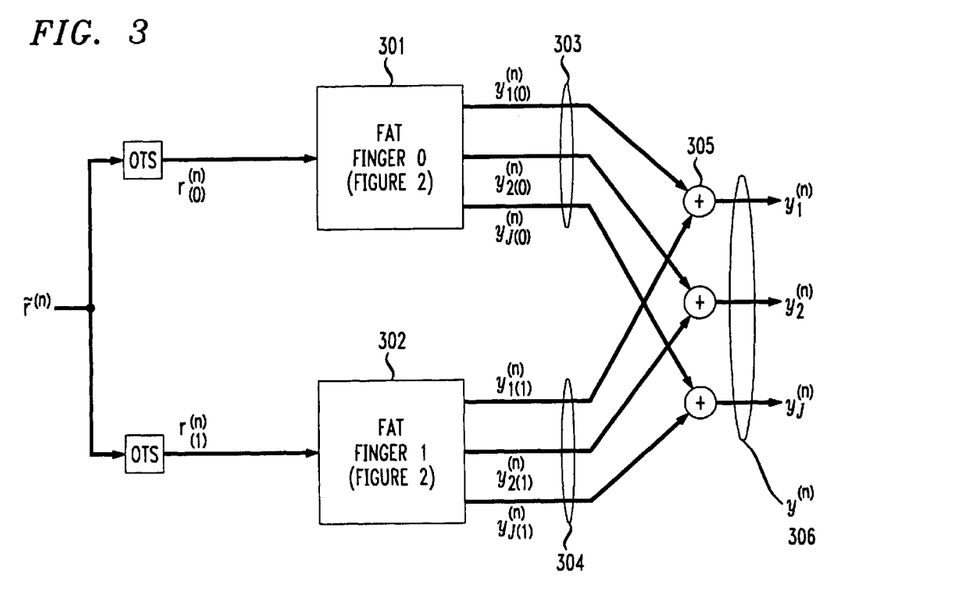
FIG. 3 shows a conventional RAKE receiver for J MC channels assuming L=2 multipaths.

FIG. 3 shows a conventional RAKE receiver for J MC channels assuming L=2 multipaths, each of the two fat fingers 301 and 302 being implemented as described in FIG. 2. While FIG. 2 shows only the L=2 multipath/fat finger case for simplicity, extending the RAKE receiver to more fingers is straightforward. The fat finger outputs 303 and 304 which correspond to the same MC channel are added together, 305, to form a decision statistic for data channel k:

$$y_k^{(n)} \equiv \sum_{l=0}^{L-1} y_{k(l)}^{(n)}$$

A mobile RAKE receiver, implemented in accordance with IS-95 standards, uses this decision statistic as an input to a Viterbi decoder (implemented as part of DSP 129 of FIG. 1). Since the resulting frame error rate of the detector is basically equivalent to the bit error rate (BER) of the coded data bits, it may be used as a performance measure of our detectors. The bit decision for the coded data on channel k is the hard limit of the RAKE output $$\hat{b}_k^{(n)}=sgn(y_k^{(n)}).$$

MC-CDMA Receiver with Pilot Interference Cancellation

Figure 4:
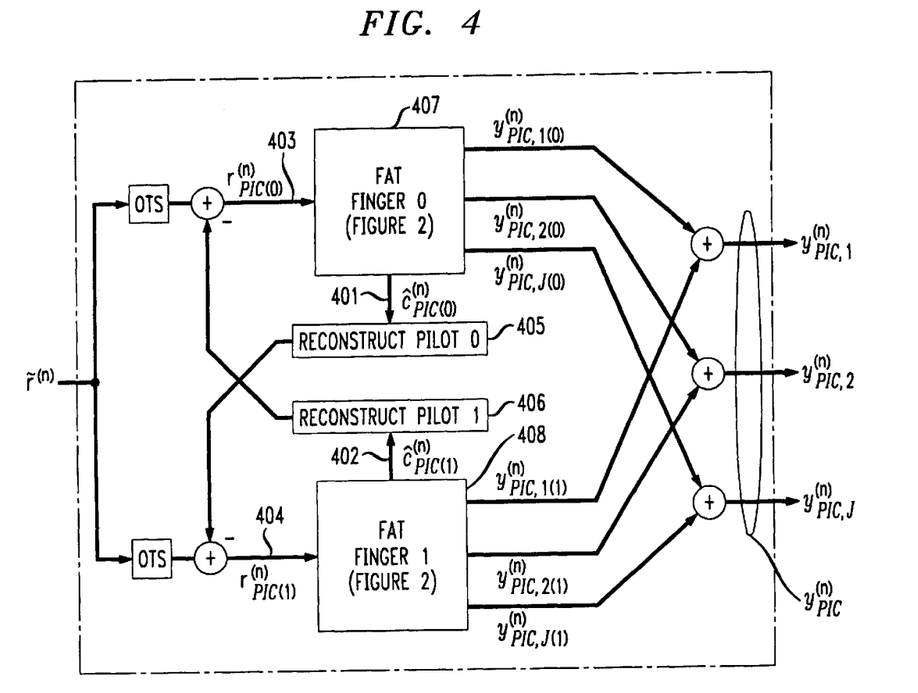
FIG. 4 shows a prior art RAKE receiver using pilot interference cancellation (PIC) circuit for J MC channels and L=2 multipaths.

Shown in FIG. 4 is a Pilot Interference Cancellation (PIC) detector for J MC Channels and L=2 multipaths. Such a PIC detector is described in the previously identified patent application "PILOT INTERERFERENCE CANCELLATION FOR A COHERENT WIRELESS CODE DIVISION MULTIPLE ACCESS RECEIVER". In that patent application, a pilot interference cancellation (PIC) detector is described which, using the channel estimates obtained during one symbol interval, reconstructs and removes the pilot interference on the next symbol interval from the channel and data demodulators, 407 and 408. Ideally, if the channel estimates 401 and 402 are perfect and the pilots perfectly reconstructed in 405 and 406, the demodulator 403 and 404 inputs will contain no pilot interference. In practice of course, there will still be residual pilot interference due to the imperfect channel estimates. This detector is recursive in that channel estimates 401 and 402 from one symbol interval are used to cancel interference to improve the channel estimates on the next symbol interval. Because of the recursive structure, this PIC detector can be implemented using very little additional hardware compared to the conventional detector. As shown in the above-identified pilot interference cancellation patent application, even for extremely fast fading (Doppler frequency of 200 Hz for cellular-band IS-95), the variation of the channel between symbols is small with respect to the channel estimate variance; hence there is almost no penalty in performance for using channel estimates from the previous symbol interval.

MC-CDMA Receiver with Combined Pilot Interference Cancellation and Partial Decorrelation In this section, we provide our motivation for combining a partial decorrelator (PD) function with the PIC detector of FIG. 4.

Notice that due to the multipath propagation and the non-orthogonal spreading codes, the components of the RAKE output $y_{PIC,k}^{(n)}$ each contain interference terms due to the other J-1 MC channels. The partial decorrelator (PD) is a linear transformation which, when applied to the RAKE output vector, attempts to eliminate this interference. To provide motivation for the decorrelator, we assume that there is no background noise and that pilot cancellation is done using perfect channel estimates from the appropriate bit interval. Thus equation (8) becomes $$r_{PIC(l)}^{(n)} \equiv \qquad (14)$$
$$r_{(l)}^{(n)} - A_0 \sum_{j \neq l} [\hat{c}_{PIC(j)}^{(n)} p_{(j|l)}^{(n)} + \hat{c}_{PIC(j)}^{(n-1)} p_{(j|l)}^{(n-1)}[L] + \hat{c}_{PIC(j)}^{(n+1)} p_{(j|l)}^{(n+1)}[R]]$$

Let $R_{[j,k]}^{(n)}$ be the L×L correlation matrix among the L paths of data channels j and k; i.e., element (u,v) of $R_{[j,k]}^{(n)}$ is $(s_j^{(n)}, s_{k(v|u|)}^{(n)})$. We define analogous matrices to denote the correlations between the signals during symbol n and symbol n+1: let element (u,v) of $R_{[j,k]}^{(n\pm1)}$ be $(s_j^{(n)}, s_{k(v|u|)}^{(n\pm1)}[L/R])$. We define the following J×J matrix:

$$R_J^{(n)} = \begin{bmatrix} R_{[1,1]}^{(n)} & \cdots & R_{[1,J]}^{(n)} \\ \vdots & & \vdots \\ R_{[J,1]}^{(n)} & \cdots & R_{[J,J]}^{(n)} \end{bmatrix} \qquad (15)$$

for symbol n and the analogous matrices $R_J^{(n\pm1)}$ for symbols n±1. Using (14) and (15) in (10), we can write the collection of decision statistics for the J multicode channels as a J-vector:

$$\bar{y}_{PIC}^{(n)} \equiv \begin{bmatrix} \bar{y}_{PIC,1}^{(n)} \\ \vdots \\ \bar{y}_{PIC,J}^{(n)} \end{bmatrix} \qquad (16)$$

$$= \text{Re}\left[\hat{C}_{PIC}^{(n)H}\left[R_J^{(n)}\hat{C}_{PIC}^{(n)}A_J b_J^{(n)} + R_J^{(n-1)}\hat{C}_{PIC}^{(n-1)}A_J b_J^{(n-1)} + R_J^{(n+1)}\hat{C}_{PIC}^{(n+1)}A_J b_J^{(n+1)}\right]\right]$$

where $\hat{C}_{PIC}^{(n)} \equiv I_J \otimes \hat{c}_{PIC}^{(n)}$ is the JL×J (perfectly estimated) complex channel amplitude matrix for symbol n, $A_J$ is the diagonal J×J matrix of data channel amplitudes, and $b_J^{(n)}$ is the J vector of data channel bits for symbol n. The bar denotes the fact that, since the channel estimates were assumed to be perfect, there are no pilot signal contributions in the RAKE filter output $\bar{y}_{PIC}^{(n)}$. Notice that the elements of the matrices $R_J^{(n\pm1)}$ are predominately zero. By taking a linear transformation of $\bar{y}_{PIC}^{(n)}$ with the matrix $[M^{(n)}]^{-1}$ (also referred to herein as the $M^{-1}$ matrix), where $$M^{(n)} \equiv \text{Re}(\hat{C}_{PIC}^{(n)H} R_J^{(n)} \hat{C}_{PIC}^{(n)}) \qquad (17)$$

is the J×J correlation matrix of the combined multipath signals of the multicode channels, the output of the linear transformation is a J vector whose kth element is simply $A_k b_k^{(n)}$ plus some residual terms due to the intersymbol interference and due to the other K–J channels:

$$[M^{(n)}]^{-1}\bar{y}_{PIC}^{(n)} = \{\text{Re}(\hat{C}_{PIC}^{(n)H} R_J^{(n)} \hat{C}_{PIC}^{(n)})\}^{-1} \text{Re}(\hat{C}_{PIC}^{(n)H}[R_J^{(n)}\hat{C}_{PIC}^{(n)}A_J b_J^{(n)} + R_J^{(n-1)}\hat{C}_{PIC}^{(n-1)}A_J b_J^{(n-1)} + R_J^{(n+1)}\hat{C}_{PIC}^{(n-1)}A_J b_J^{(n+1)}])$$

$$= \{\text{Re}(\hat{C}_{PIC}^{(n)H} R_J^{(n)} \hat{C}_{PIC}^{(n)})\}^{-1} \left\{ \begin{array}{l} \text{Re}(\hat{C}_{PIC}^{(n)H} R_J^{(n)}\hat{C}_{PIC}^{(n)})A_J b_J^{(n)} \\ +\text{Re}(\hat{C}_{PIC}^{(n)H} R_J^{(n-1)}\hat{C}_{PIC}^{(n-1)})A_J b_J^{(n-1)} + \text{Re}(\hat{C}_{PIC}^{(n)H} R_J^{(n-1)}\hat{C}_{PIC}^{(n-1)})A_J b_J^{(n-1)} \end{array} \right\}$$

$$= A_J b_J^{(n)} + \underbrace{\{\text{Re}(\hat{C}_{PIC}^{(n)H} R_J^{(n)} \hat{C}_{PIC}^{(n)})\}^{-1}\{\text{Re}(\hat{C}_{PIC}^{(n)H} R_J^{(n-1)}\hat{C}_{PIC}^{(n-1)})A_J b_J^{(n-1)} + \text{Re}(\hat{C}_{PIC}^{(n)H} R_J^{(n-1)}\hat{C}_{PIC}^{(n-1)})A_J b_J^{(n-1)}\}}_{\text{Residual Interference}}$$

Figure 5:
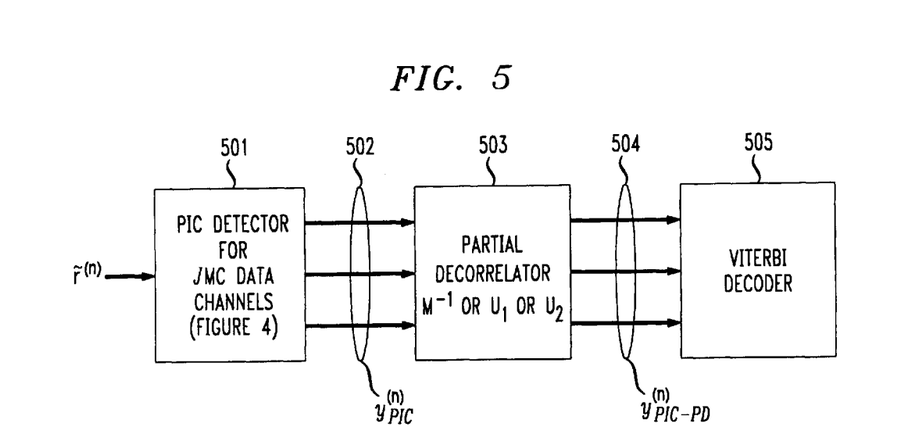
FIG. 5 shows a block diagram of a RAKE receiver including a Pilot Interference Cancellation (PIC) circuit and a Partial Decorrelator (PD) circuit in accordance with the present invention.

Hence the linear transformation is a partial decorrelator in that it decorrelates the MC channels from each other but not from the other K–J channels. The larger J is in relation to K, the more interference this transformation will eliminate. If the data symbols $b_k^{(n)}$ are uncoded BPSK bits, then the bit decision can be made on the unnormalized decorrelator output: $\hat{b}_k^{(n)} = \text{sgn}[\{[M^{(n)}]^{-1}\bar{y}_{PIC}^{(n)}\}_k]$. In IS-95, the symbols are coded BPSK bits, and the kth decorrelator output should be normalized by $A_k$ before passing the result to the Viterbi decoder 505.

Returning to the practical case of imperfect pilot cancellation and background noise, the linear transformation will no longer decorrelate the MC channels perfectly; in addition to the residual terms stated above, there will be contributions in the decorrelator output due to the other MC channels, uncancelled pilot signals, and background noise. However in general, the contributions due to the MC channels will be greatly reduced at the decorrelator output compared to the input.

With reference to FIG. 5, there is shown a RAKE receiver including PIC detector 501 and partial decorrelator 503. Applying the linear transformation defined by $[M^{(n)}]^{-1}$, 503, to the PIC detector 501 output vector $y_{PIC}^{(n)}$, 502, we define the partial decorrelator output 504 as $$y_{PIC-PD}^{(n)} \equiv [M^{(n)}]^{-1} y_{PIC}^{(n)} \qquad (18)$$

Since the channel codes change on each symbol interval, their correlations in $R_J^{(n)}$ also change and the matrix inverse must be computed on each symbol interval. For a large number of MC channels J, this matrix inversion may be too computationally intensive for a mobile handset. Because of the (nearly) random spreading codes for the data channels, the correlation matrix $R_J^{(n)}$ is strongly diagonal. Consequently, the correlation matrix of the J combined multipath signals $M^{(n)}$ is also strongly diagonal, and the partial decorrelator $[M^{(n)}]^{-1}$ can be replaced by an approximation which is more easily computed than the actual inverse. We present two approximations using the diagonal and off-diagonal terms of $M^{(n)}$.

For the first approximation, we let $F^{(n)}$ be the J×J diagonal matrix whose terms are the corresponding diagonal components of $M^{(n)}$. Let $O^{(n)} \equiv M^{(n)} - F^{(n)}$ be the matrix of the off-diagonal terms of $M^{(n)}$. Then a first order approximation of $[M^{(n)}]^{-1}$ is $$u_1^{(n)} \equiv [F^{(n)}]^{-1} - [F^{(n)}]^{-1} O^{(n)} [F^{(n)}]^{-1} \quad (19)$$

and for large J, this approximation is more easily calculated than the matrix inverse $[M^{(n)}]^{-1}$. The performance of the approximate decorrelator was analyzed for the case of J=K in the article by M. Narayan and S. Verdú, "Analysis of an Approximate Decorrelating Detector," published in *Wireless Personal Communications*, January 1997.

The partial decorrelator (PD) can be further simplified using the observation that the L×L matrix $R_{|k,k|}^{(n)}$ is well-approximated by the L×L identity matrix. It follows that the kth diagonal term of F is well-approximated by $\|\hat{c}_{PIC}^{(n)}\|$; hence $$u_1^{(n)} \approx I_J / \|\hat{c}_{PIC}^{(n)}\|^2 - o^{(n)} / \|\hat{c}_{PIC}^{(n)}\|^4 \quad (20)$$

where $I_J$ is the J×J identity matrix. Since the coded data symbols $b_k^{(n)}$, are BPSK modulated, we can renormalize the approximation in (20) to obtain the second approximation to $[M^{(n)}]^{-1}$:

$$u_2^{(n)} = I_J - o^{(n)} / \|\hat{c}_{PIC}^{(n)}\|^2. \quad (21)$$

The approximations to the partial decorrelator shown in equations (20) and (21) can be part of an effective implementation which has lower complexity than the implementation of the partial decorrelator shown in equation (18). Furthermore, the performances of these approximations are nearly identical to the original partial decorrelator in realistic environments where the channel estimates are not exact. Hence from a performance-complexity standpoint, implementations using the approximations may be preferable.

Other Partial Decorrelator Circuits

While the PD decorrelator 503 is shown in FIG. 5 as being utilized with a PIC detector, it should be noted that, the PD decorrelator 503 can be utilized with a non-coherent RAKE detector of FIG. 2. In such a non-coherent RAKE detector, the PD decorrelator 503 connects to the outputs 211 of the fat finger detector 200 of FIG. 2.

Figure 6:
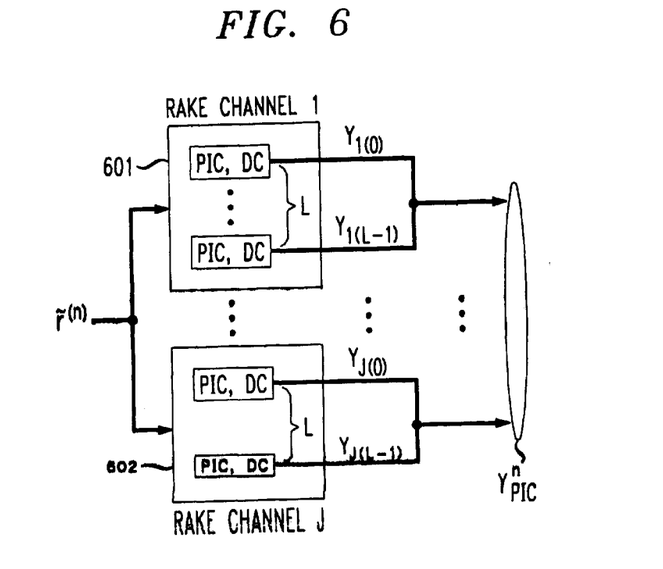
FIG. 6 shows a RAKE receiver having PIC and PD circuits arranged on a channel basis.

FIG. 6 shows a RAKE receiver having PIC and PD circuits arranged on a channel basis. As shown, each of the J RAKE receivers 601 and 602 include L PIC and DC detectors. Such an arrangement thus utilize a total of J·L PIC and J·L PD detectors.

Figure 7:
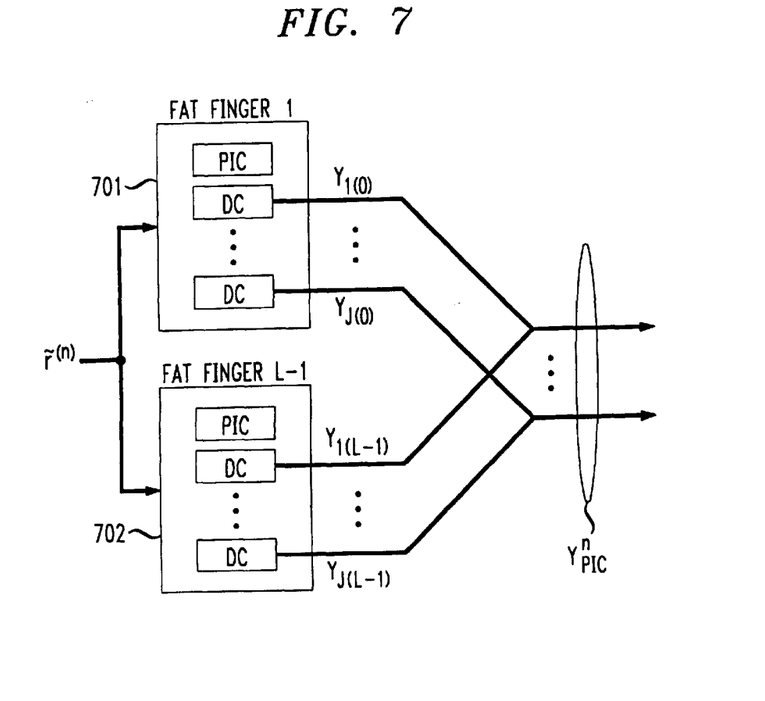
FIG. 7 shows a RAKE receiver having PIC and PD circuits arranged on a path basis.

FIG. 7 shows an improved RAKE receiver arrangement having PIC and PD circuits arranged on a path basis. As shown, each of the L RAKE receivers 701 and 702 include one PIC detector whose outputs are use with the J DC detectors. Such an arrangement thus utilize a total of L PIC and J·L PD detectors.

Conclusion

The partial decorrelation (PD) detector 503 provides a method for mitigating the effects interference due to non-orthogonal multipath components. This technique applies to either coherent multicode (MC) CDMA receivers at the mobile terminal which simultaneously demodulate J>1 data channels or to non-coherent MC CDMA receivers at the base station. The PD detector 503 performs a linear transformation on the vector output from a bank of J RAKE receivers. Ideally, the resulting vector's components will be decorrelated from each other; however, there will still be residual interference due to the other channels not demodulated by this MC receiver and intercell interference. The PD linear transformation is represented by a J xJ matrix inverse. Because the matrix is diagonally dominant, significantly less complex approximations to the inverse can be used. In almost all cases, the performance degradation due the approximations are negligible.

Used in conjunction with pilot interference cancellation (PIC), the combined PIC-PD detectors benefit from the combined effects of both techniques. These benefits are quite significant in light of the minimal added complexity required. The performance improvement of the combined PIC-PD detector of FIG. 5 over the PIC detector of FIG. 4 (and over the conventional detector with no interference cancellation) increase as the number of MC channels J increases and as the number of demodulated multipath components L increases. The relative performance gains of the PIC-PD detector of FIG. 5 over the PIC detector of FIG. 4 are not as significant as the gains of the PIC detector over the conventional detector of FIG. 3. (with no interference cancellation). However, because of the relative simplicity of the approximate PD implementation, the combined PIC-PD is considered as a viable enhancement for future IS-95 MC mobile receivers.

What has been disclosed is merely illustrative of the present invention. Other arrangements can be implemented by those skilled in the art without departing from the spirit and scope of the present invention.

We claim:

1. A multiple-code (MC) code division multiple access (CDMA) receiver for simultaneously receiving and demodulating J data signals within a CDMA signal, where J is an integer, J>1, and where the jth data signal, j=1 . . . J, is received over a plurality of $L_j$ paths where $L_j$ is an integer, $L_j \geq 1$, the MC-CDMA receiver comprising means for receiving the J data signals, and forming therefrom $L_j$ multipath delay estimates and $L_j$ channel estimates for the jth data signal, means for demodulating $L_j$ multipath components of the jth data signal and combining the results to form J decision statistics for the J data signals, a decorrelator, responsive to the L, $L=L_1+L_2+ \ldots +L_J$, channel estimates, the L multipath delays and the J data-signal codes, for suppressing, for a desired received data signal, interference caused by the other J−1 data signals; and a processor for producing therefrom the desired demodulated data signal.

2. The MC-CDMA receiver of claims 1 wherein the interference suppression means includes means for forming a J-by-J inverse correlation matrix $M^{-1}$ from the J decision statistics.

3. The MC-CDMA receiver of claim 2 wherein the $M^{-1}$ matrix forming means is approximated using a $U_1$ matrix.

4. The MC-CDMA receiver of claim 2 wherein the $M^{-1}$ matrix forming means is approximated using a $U_2$ matrix.

5. The MC-CDMA receiver of claims 1 wherein the received signal includes a separate pilot signal transmitted over the same channel as the desired data signal.

6. The MC-CDMA receiver of claim 5 wherein the path demodulator means includes a pilot interference canceller for cancelling interference due to undesired pilot multipath components.

7. The pilot interference canceller of claims 5 including a switch means in each path demodulator to switch on/off the pilot cancellation according to the path power of its designated multipath component.

8. The MC-CDMA receiver of claims 5 wherein the received signal consisting of at least the J data signals and a pilot signal is transmitted from a common transmitter, so that $L_1=L_2=\ldots=L_J$, and wherein the receiving means is implemented using $L_1$ fat fingers, each fat finger having one pilot path demodulator and a plurality of J data-signal path demodulators.

9. The MC-CDMA receiver of claims 1 wherein the received signal consisting of at least the J data signals is transmitted from a common transmitter.

10. The MC-CDMA receiver of claims 1 being part of a user station of a CDMA system including at least one base station and a plurality of user stations.

11. The MC-CDMA receiver of claims 1 being part of a base station of a CDMA system including at least one base station and a plurality of user stations.

12. The MC-CDMA receiver of claims 1 wherein the processor means includes a Viterbi decoder to produce the desired demodulated data signal.

13. A method of operating a multiple-code (MC) code division multiple access (CDMA) receiver for simultaneously receiving and demodulating J data signals within a CDMA signal, where J is an integer, J>1, and where the jth data signal, j=1 ... J, is received over a plurality of $L_j$ paths where $L_j$ is an integer, $L_j \geq 1$, the method comprising steps of receiving the J data signals, and forming therefrom $L_j$ multipath delay estimates and $L_j$ channel estimates for the jth, j=1 to J, data signal, demodulating $L_j$ multipath components of the jth data signal and combining the results to form J decision statistics for the J data signals, at a decorrelator, responsive to the L, $L=L_1+L_2+\ldots+L_J$, channel estimates, the L multipath delays and the J data-signal codes, suppressing, for a desired received data signal, interference caused by the other J–1 data signals; and at a processor, producing therefrom the desired demodulated data signal.

14. The method of claim 13 further including the step of:

forming a J-by-J inverse correlation matrix $M^{-1}$ from the J decision statistics.

15. The method of claim 13 wherein the forming step uses a $U_1$ matrix to approximate the $M^{-1}$ matrix.

16. The method of claim 13 wherein the forming step uses a $U_2$ matrix to approximate the $M^{-1}$ matrix.

17. The method of claim 13 wherein the received signal includes a separate pilot signal transmitted over the same channel as the desired data signal.

* * * * *